Sept. 24, 1929.  H. V. WELCH  1,729,196
PROCESS FOR RECOVERY OF TIN AND SIMILAR FUNCTIONING
METALS FROM MATERIALS CONTAINING THE SAME
Filed April 20, 1927  2 Sheets-Sheet 1

INVENTOR.
Harry V. Welch,
BY Arthur P. Knight
and Alfred W. Knight
ATTORNEYS.

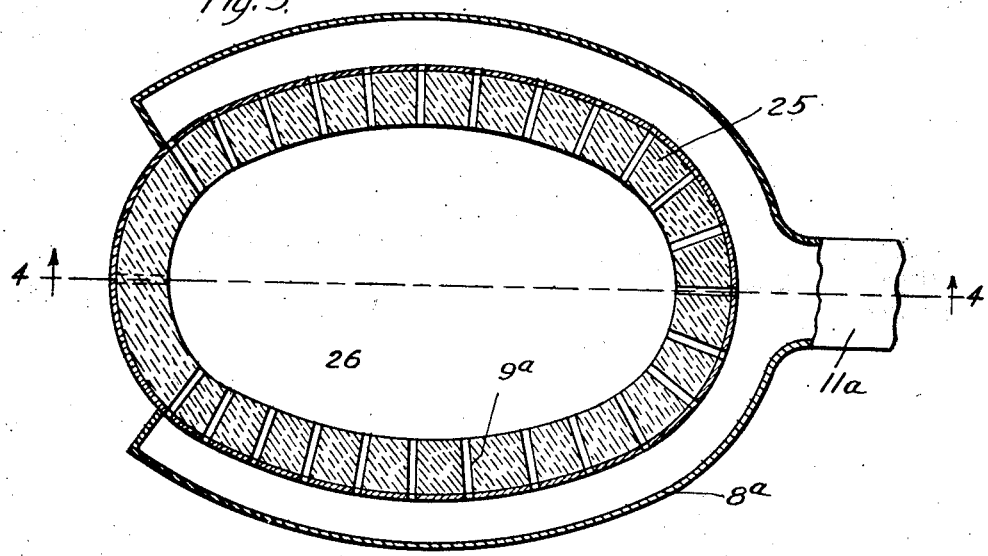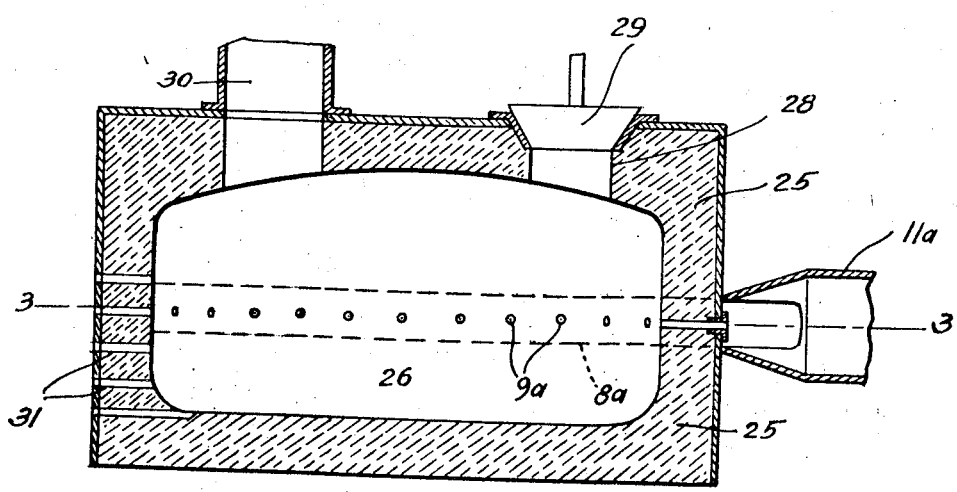

Patented Sept. 24, 1929

1,729,196

UNITED STATES PATENT OFFICE

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA

PROCESS FOR RECOVERY OF TIN AND SIMILAR FUNCTIONING METALS FROM MATERIALS CONTAINING THE SAME

Application filed April 20, 1927. Serial No. 185,152.

This invention relates to the removal of tin and similar functioning metals from materials containing the same, and particularly from smelter slags, ores, and concentrates, and to the recovery of such constituents, by heating such materials in the presence of an added halidizing agent so as to cause volatilization of such constituents in the form of halides.

An important object of the invention is to provide for recovery of tin and similar functioning metals from slags, ores, or concentrates, with a minimum consumption of fuel and with a minimum operating expense, and in a high state of purity.

A further object of the invention in certain cases is to remove tin or similar functioning metal from a material containing the same, for the purpose of permitting subsequent recovery in a purer state of some other unvolatilized constituent or constituents of the material, such as iron.

A further object of the invention is to provide for production of heat, together with addition of chloridizing agent, beneath the surface of a molten mass of the metal bearing material—and hence in direct contact therewith—so as to obtain more efficient utilization of such heat in effecting fusion of the material, more rapid reaction of the metallic values with the halidizing agent, and more rapid removal of the metallic halides from the mass.

A further object, when the recovery of the volatilized metallic halides is practiced, is to cause the ash constituent of the fuel to be retained in the molten mass of material being treated, and hence prevent the same from being carried off with the metallic halide vapors and contaminating the product.

Particular objects of the invention are to facilitate the reaction between the halidizing agent and the metallic or metal bearing constituents of the material being treated; to facilitate removal of the metallic halide vapors from the molten material and hence maintain a low partial pressure of such vapors in contact with such material, thereby accelerating vaporization of the metallic halides; and to minimize the volume of gases discharged from the volatilizing apparatus, thus obtaining a corresponding reduction in size and cost of the necessary condensing and fume recovering apparatus.

Tin metallurgy encounters great difficulties in preventing excessive losses of tin with the slag, and the treatment of slag for additional recovery of tin is an important and relatively expensive operation at all smelters.

I have, however, found a simple and relatively inexpensive process by which such tin furnace slags may be advantageously cleaned, and which at the same time offers a means of treating economically the entire recovery of tin from its ores and concentrates.

Metallic tin possesses certain rather remarkable physical properties; for example, although its melting point is very low in comparison with most metals, approximately 230° C., its boiling point is very high, above 2200° C., thus indicating the impracticability of commercial volatilization of the metal as such. Tin oxide forms with silica, $SiO_2$, one or more very stable tin silicates and of a form in which at the temperature obtained in tin reverberatory smelting hearths it is not entirely satisfactorily replaced by lime, CaO, of the limestone flux commonly used.

In my United States Patent No. 1,414,491, dated May 2, 1922, there is disclosed a process and apparatus for removing certain metallic values from slag by contact of a chloridizing agent with the heated slag, in the presence of an oxidizing atmosphere, and with or without further heating of the slag. Extended volatilization tests on tin bearing materials, however, using a halide salt as a volatilizing agent, for example sodium chloride or calcium chloride, have shown that in the presence of an oxidizing atmosphere volatilization of the tin as a halide salt will not take place in an appreciable amount, even at very high furnace temperatures on the order of 1200° C. On the other hand, I have found that if a reducing or non-oxidizing atmosphere is maintained, tin in the presence of a suitable chloridizing or halidizing agent may be substantially completely removed by volatilization as a halide at a suitable temperature; for example by using sodium chloride as halidizing agent, the tin may be removed as a volatile chloride at a temperature of 1000° C. In this respect of the requirement for a reducing or non-oxidizing atmosphere for satisfactory halide volatilization, tin is distinctly different from such metals as silver, copper, and lead, where I have found an oxidizing or at least a non-reducing atmosphere essential for practical and commercial halide volatilization operations. The process of the present invention is therefore primarily distinguished from that described in my said United States patent by the fact that a reducing or non-oxidizing atmosphere is maintained during the halidizing and volatilizing operation. I do not wish to be limited specifically to tin, however, as there are probably other metals which function in a similar manner and require a non-oxidizing atmosphere in order to effect volatilization in the form of halides, and although tin is the only metal which I have so far found to require this condition I also wish to cover the application of this same method of procedure in the case of other metals which may be found to be amenable thereto. The term "tin and similar functioning metals" as used herein should therefore be understood to include all metals which require a reducing or non-oxidizing atmosphere for satisfactory volatilization in the form of halides.

The preferred embodiment of my present process also constitutes an improvement over that described in said patent, with respect to the manner of carrying out the halidizing and volatilizing operations. An important feature of this preferred embodiment consists in adding both a halidizing agent and a combustible and reducing material to an air blast, and delivering this mixture beneath the surface of the mass of material to be treated, such material being maintained substantially in molten condition throughout the major portion of the process. The amount of combustible and reducing material so supplied is proportioned not only to produce upon combustion the desired temperature in the molten bath of material, but also to provide a sufficient proportion of such reducing material so as to maintain a reducing or non-oxidizing atmosphere at the point where the halidizing and volatilizing action is carried out.

Any suitable material may be used as a reducing agent and combustible material, for example powdered coal, liquid fuel, such as oil mist, vapor or spray or fuel gas, such material being introduced in any suitable manner into the air blast before the same is delivered to the material to be treated. Other necessary or desirable slagging or replacement agents, such as lime or limestone, dolomite, and the like, may if desired, be introduced into the charge of molten material either bodily or together with the air blast.

The chloridizing or halidizing agent may comprise any suitable chloride or halide salt, for example finely divided sodium chloride or calcium chloride, and such agent may be introduced into the air blast in any proportion which may be found suitable or desirable for maintaining rapid production and liberation of metallic halides together with a satisfactory efficiency of utilization of such agent.

The heat generated by the combustion of the combustible mixture beneath the surface of the molten material serves to keep the material heated to the desired temperature, to furnish the heat required for the halidizing reaction, and to vaporize the resulting metallic halides. In cases where it is desired to recover the metallic halides thus driven off, the gases escaping from the molten material and consisting principally of combustion products and excess air, together with the metallic halide vapors and other products vaporized from the material being treated, are then cooled to a sufficiently low temperature to cause condensation of the metallic halides in the form of a fume or fine dust, and such fume may then be separated from the gases by any suitable means, for example by means of the Cottrell electrical precipitation process.

In other cases, the method may be used principally or wholly to remove certain constitu- 1 ents which constitute impurities in the desired product. For example many smelter slags and other materials contain considerable quantities of iron which may be recovered therefrom by well-known means, but also con- 1 tain other metals, such as copper, in sufficient quantity to seriously impair the quality and value of the iron so obtained. In such cases, these undesirable impurities may be removed by means of my present method, and the re- 1 maining material may then be treated in any well-known manner, for example as hereinafter described, for the recovery of such iron therefrom.

In some cases the process may be used both 1 for the recovery of metallic values from the material by volatilization, and also for the production of a higher grade product from the unvolatilized material.

Certain forms of apparatus which are particularly advantageous for carrying out the above described process, and which constitute part of the present invention, are shown in the accompanying drawings, and referring thereto:

Fig. 3 is a horizontal section of another form of apparatus, taken on line 3—3 in Fig. 4.

Fig. 4 is a vertical section on line 4—4 in Fig. 3.

Figure 1:
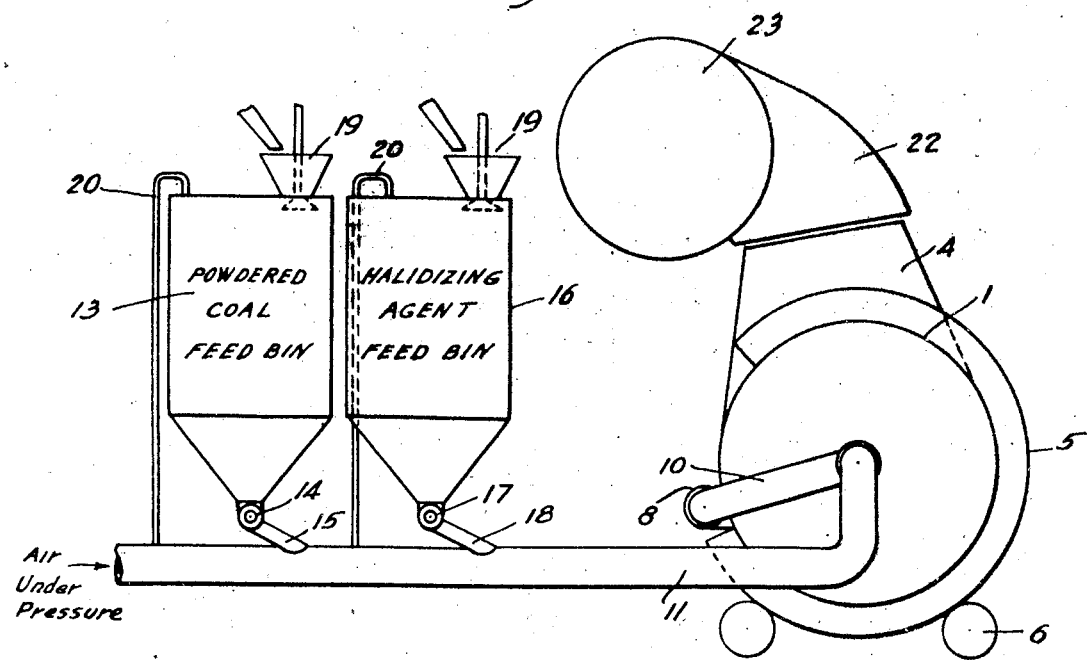
Fig. 1 is a diagrammatic side elevation of one form of such apparatus.
Figure 2:
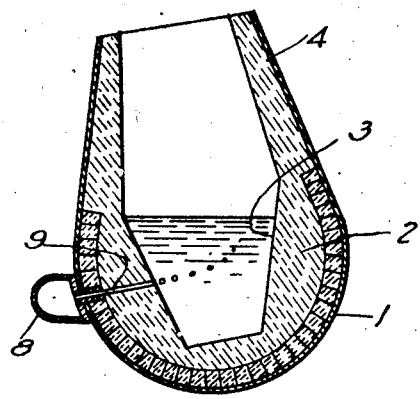
Fig. 2 is a transverse section of the volatilizing apparatus shown in Fig. 1.

The apparatus shown in Figs. 1 and 2 comprises a voaltilizing apparatus similar to an ordinary converter and comprising a cylindrical shell 1 lined with refractory material indicated at 2, the interior of which constitutes a heating or volatilizing chamber 3. Said converter is further provided with a tapering mouth portion 4 extending upwardly from the cylindrical portion, through which the material to be treated may be supplied thereto and through which the gases and vapors produced during the operation may be delivered. Said volatilizing device may be mounted in the usual manner of converters, for example by means of track means 5 supported on rollers 6, and may also be provided with any suitable means such as are usually found on converters, for tilting the same about its axis after completion of the volatilizing operation, for discharge of the contents therefrom.

Means are also provided for delivering to the interior of said volatilizing chamber and beneath the surface of the material therein, a mixture of air, fuel, and halidizing agent. Such means may comprise, for example, the usual windbox 8 extending along one side of the converter and provided with a plurality of tuyères 9 distributed lengthwise thereof and establishing communication between said windbox and chamber 3. Said windbox may be connected by means of radially extending pipe 10 to supply pipe 11, in such manner as to permit tilting of the device without disconnecting said pipes.

Pipe 11 may be connected to any suitable source of supply of air under suitable pressure for maintaining a blast of air through the material in the volatilizing device. Means are also provided for supplying to pipe 11 both fuel and halidizing agent, said materials being preferably supplied independently so that if desired at certain stages of the operation, the supply of one or both of these materials may be interrupted. For example a feed bin 13 may be provided for supplying powdered coal or other solid fuel or reducing agent through screw conveyor 14 and pipe 15 into the supply pipe 11, and a second feed bin may be provided for delivering powdered sodium chloride or other halidizing agent through screw conveyor 17 and pipe 18 into the supply pipe 11. Each of said feed bins may be provided with means such as the well-known bell and hopper device 19 for admitting material thereto while substantially preventing leakage of air therethrough, and with pressure equalizing pipes 20 communicating with pipe 11 and with the respective feed bins so as to maintain within said feed bins a pressure equal to that in the pipe 11. It will be understood that any form of reducing agent or combustible material may be used in the process instead of powdered fuel, for example fuel oil or fuel gas may be employed and any suitable means may be provided for introducing such fuel to the air supply pipe.

A vapor hood 22 may be provided over the open end of mouth 4 for receiving the gases and vapors passing out through said mouth, said hood opening into gas passage 23 through which the gases and vapors may be conducted if desired to any suitable apparatus for effecting cooling thereof to cause condensation of the evolved metallic halides, and separation of such halides from the gas stream. For example, as described in my aforesaid patent, said gases may be conducted to a Cottrell electrical precipitator, or to a bag house, settling chamber, spray tower, or other separating apparatus. It will be understood, of course, that flue 23 may if desired be provided with a fan or other means for inducing a slight draft therein so as to insure that substantially all of the vapors passing out of the volatilizing device will be drawn through hood 22 into said flue.

Instead of employing a movably mounted converter or volatilizing device, a stationary form of apparatus may be employed, as shown in Figs. 3 and 4. Said apparatus comprises a housing 25 of suitable refractory material surrounding a heating chamber 26, and may be provided as before with windbox $8^a$ communicating through tuyères $9^a$ with said heating chamber. Supply pipe $11^a$ may be provided as before for conducting the mixture of air, fuel, and halidizing agent to said windbox. The pipe $11^a$ may be provided with means similar to those shown in Fig. 1 for supplying powdered fuel and halidizing agent thereto, or with any other suitable means for this purpose. The apparatus shown in Figs. 3 and 4 may further comprise opening means 28 through which the material to be treated may be supplied, said opening means being provided with suitable closure means 29. Outlet flue 30 may also be provided for conducting away the gases and vapors for separation of the fume therefrom, and tap holes 31 may be provided through which the unvolatilized residue may be drawn off either continuously or from time to time.

As an example of one method of carrying out my process I will describe the recovery of tin by volatilization, and of iron by subsequent treatment, from smelter slag containing these substances, using the apparatus shown in Figs. 1 and 2. The converter is first tilted to charging position, and the molten slag coming for example from a reverberatory or blast furnace, is delivered to the interior thereof so as to fill the same to the desired level for example as shown in Fig. 2. The converter is then moved to the position shown in Fig. 1 and the mixture of air, reducing agent, and sodium chloride or other halidizing agent may then be admitted beneath the surface of the molten material by means of tuyères 9. As above mentioned, a suitable reagent such as lime or limestone may also be added with the charge or through the air blast, for reacting with silicates of tin present in the material to liberate metallic tin. Also if it is found desirable, in order to increase the temperature and fluidity of the slag or for any other reason, the combustible mixture of air and fuel may be first admitted without the halidizing agent so as to subject the material to a preliminary heating operation prior to the volatilization operation. Furthermore, in case the slag contains objectionable amounts of constituents such as sulphur, arsenic and the like, a blast of air alone may be admitted; prior to said volatilizing operation, for a sufficient period of time to remove the desired quantity of these constituents. Such preliminary heating and blowing operations are however merely incidental to the process and form no essential part of the invention.

During the main volatilizing stage of the operation the three essential constituents, air, reducing agent, and halidizing agent, are introduced together in such proportions as to maintain a non-oxidizing atmosphere, and preferably in such proportion as to provide an excess of such reducing agent and hence maintain a reducing atmosphere, in contact with the molten material.

Under the conditions above described the combustion occurs in direct contact with the slag and a maximum efficiency of heat transfer to the slag is therefore obtained. This is to be distinguished from the relatively inefficient heat transfer obtained by combustion in a chamber above a bath of slag as for example in a furnace of the reverberatory type. Furthermore, the incombustible or ash constituent of the fuel is to a large extent mechanically retained in the slag and thus prevented from escaping with the exit gases and contaminating the collected fume. Furthermore, when powdered fuel or other solid material is used as reducing agent, the excess of such material which is necessary to maintain a reducing atmosphere is also retained in the body of molten material. Also the passage of the gaseous products of combustion and other gases up through the molten material serves to thoroughly agitate the same and constantly bring fresh portions of the charge into contact with the hot gases and also with the chloridizing agent. The sodium chloride or other halidizing agent is also supplied into intimate contact with the molten slag, and at the temperature maintained by the above described combustion and in the presence of a non-oxidizing or reducing atmosphere, such halidizing agent reacts rapidly with the tin and tin-bearing materials present in the slag to form tin halides, which are rapidly volatilized and pass off with the combustion gases through the mouth of the converter and hence through hood 22 and flue 23 to the fume collecting means above mentioned. In case sodium chloride is used as the halidizing agent the evolved halide vapor will consist of tin chloride (or the chloride or chlorides of whatever metal or metals of those above named are present in the slag.) Such vapors condense upon cooling to form a solid fume which may be collected in substantially pure form, due in part to the retention of the ash constituent of the fume in the slag.

After the removal of the desired proportion of the tin as above described the slag may be treated in any well-known manner for recovery of iron therefrom. For example the combustion may be continued in the presence of a reducing atmosphere within the converter and a suitable material such as lime may be added for the purpose of reacting with iron bearing constituents of the slag to form calcium silicate and set free metallic iron. The iron is produced in a molten condition and may be removed from the converter in this condition by simply tilting the same in the usual manner or, in the case of the apparatus shown in Figs. 3 and 4, by opening the tap holes 31.

The above described process may be applied to materials other than slags, for example to low grade ores of various kinds, containing one or more metals capable of volatilization under the above conditions. It is not necessary that the material to be treated should be charged into the converter in molten condition, as such material may in some cases be introduced in solid form, as for example in the form of lumps or fragments which may then be melted in the converter by combustion in contact therewith of fuel and air supplied through tuyères 9. In case the operation is carried out in this manner, the introduction of halidizing agent along with the fuel and air should preferably not commence until the material is reduced to a molten or fluid condition and heated to substantially the necessary temperature for volatilization of the halide or halides to be formed in the process.

Another modification of the process, in cases where a plurality of different metals of those above named are present in the material, consists in successively increasing the temperature during the volatilizing operation so as to successively evolve halide vapors of successively higher boiling points. The vapors driven off during such scuccessive heating stages may be condensed and collected separately from one another, thus obtaining a separation of such metals by fractional distillation.

I claim:

1. The method of recovery of tin and similar functioning metals from materials containing the same, which comprises introducing a mixture of air, a reducing agent and a halidizing agent beneath the surface of a molten body of such material so as to cause combustion of a portion of such reducing agent, and to also cause production and volatilization of the halide of the metals to be recovered, such reducing agent being present in sufficient quantity to maintain a reducing atmosphere in contact with the material, removing the resulting metallic halide from the body of material in vapor form, and then condensing and collecting such metallic halide.

2. The method of volatilizing tin in the form of chloride from material containing the same, which comprises introducing a mixture of air, a reducing agent, and a chloridizing agent, beneath the surface of a molten body of such material so as to cause combustion of a portion of such reducing agent and reaction of said chloridizing agent with the tin to form tin chloride and to also cause volatilization of such tin chloride, said reducing agent being introduced in sufficient proportion to maintain the reducing atmosphere which is essential to the production and volatilization of such tin chloride.

3. The method of recovery of tin and similar functioning metals from materials containing the same, which comprises introducing a mixture of air, a reducing agent and a halidizing agent beneath the surface of a molten body of such material so as to cause combustion of a portion of such reducing agent, and to also cause production and volatilization of the halide of the metals to be recovered, such reducing agent being present in sufficient quantity to maintain a non-oxidizing atmosphere in contact with the material, removing the resulting metallic halide from the body of material in vapor form, and then condensing and collecting such metallic halide.

In testimony whereof I have hereunto subscribed my name this 12th day of April, 1927.

HARRY V. WELCH.